(12) United States Patent
Yu et al.

(10) Patent No.: US 10,115,267 B1
(45) Date of Patent: *Oct. 30, 2018

(54) METHOD AND SYSTEM FOR FACILITATING CHANCE-BASED PAYMENT FOR ITEMS IN A GAME

(71) Applicant: Electronic Arts Inc., Redwood City, CA (US)

(72) Inventors: Christopher Yu, San Francisco, CA (US); Bryan Tsao, San Carlos, CA (US); John Kim, San Francisco, CA (US); Kevin Chanthasiriphan, San Francisco, CA (US); Wynne Chyou, San Francisco, CA (US)

(73) Assignee: ELECTRONICS ARTS INC., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/402,188

(22) Filed: Jan. 9, 2017

Related U.S. Application Data

(63) Continuation of application No. 14/320,532, filed on Jun. 30, 2014, now Pat. No. 9,539,502.

(51) Int. Cl.
  *G07F 17/32* (2006.01)
  *G06Q 30/06* (2012.01)

(52) U.S. Cl.
  CPC ......... *G07F 17/3244* (2013.01); *G06Q 30/06* (2013.01); *G07F 17/3225* (2013.01); *G07F 17/3274* (2013.01); *G07F 17/3286* (2013.01)

(58) Field of Classification Search
  None
  See application file for complete search history.

(56) References Cited

U.S. PATENT DOCUMENTS

| | | |
|---|---|---|
| 5,816,918 A | 10/1998 | Kelly |
| 5,933,813 A | 8/1999 | Teicher |

(Continued)

FOREIGN PATENT DOCUMENTS

| | | |
|---|---|---|
| KR | 1020130137431 | 12/2013 |
| WO | 2002026333 | 1/2002 |

(Continued)

OTHER PUBLICATIONS

New Feature: Tiered Tournaments and Tournament Updates, printed from http://community.kabam.com/forums/showthread.php?171349-New-Feat on Feb. 11, 2014, 2 pages.

(Continued)

*Primary Examiner* — Jason Skaarup
(74) *Attorney, Agent, or Firm* — Knobbe, Martens, Olson & Bear, LLP

(57) ABSTRACT

A method and system for facilitating chance-based payment for items in a game. In implementations, the disclosure relates to such systems which can be used in the payment for items in an affiliation based game. A user may be part of an affiliation and wish to contribute to their affiliation and show their loyalty in a non-direct manner. The contribution may be achieved by the user entering into a chance-based selection process such as a draw, where the user selected in the draw is the person that pays for a group virtual item used in the game. The item used in the game may benefit all members of the affiliation, simultaneously or in alternating fashion.

20 Claims, 3 Drawing Sheets

(56) References Cited

U.S. PATENT DOCUMENTS

| | | |
|---|---|---|
| 5,964,660 A | 10/1999 | James |
| 6,142,472 A | 11/2000 | Kliebisch |
| 6,190,225 B1 | 2/2001 | Coleman |
| 6,190,255 B1 | 2/2001 | Thomas |
| 6,347,996 B1 | 2/2002 | Gilmore |
| 6,402,619 B1 | 6/2002 | Sato |
| 6,561,904 B2 | 5/2003 | Locke |
| 6,604,008 B2 | 8/2003 | Chudley |
| 6,745,236 B1 | 6/2004 | Hawkins |
| 6,811,483 B1 | 11/2004 | Webb |
| 6,850,900 B1 | 2/2005 | Hare |
| 6,928,474 B2 | 8/2005 | Venkatesan |
| 7,076,453 B2 | 7/2006 | Jammes |
| 7,381,133 B2 | 6/2008 | Thomas |
| 7,533,336 B2 | 5/2009 | Jaffe |
| 7,660,740 B2 | 2/2010 | Boone |
| 7,682,239 B2 | 3/2010 | Friedman |
| 7,785,188 B2 | 8/2010 | Cannon |
| 7,813,821 B1 | 10/2010 | Howell |
| 7,819,749 B1 | 10/2010 | Fish |
| 7,945,802 B2 | 5/2011 | Hamilton, II |
| 7,959,507 B2 | 6/2011 | Cannon |
| 8,010,404 B1 | 8/2011 | Wu |
| 8,016,668 B2 | 9/2011 | Hardy |
| 8,047,909 B2 | 11/2011 | Walker |
| 8,057,294 B2 | 11/2011 | Pacey |
| 8,066,571 B2 | 11/2011 | Koster |
| 8,147,340 B2 | 4/2012 | BrunetdeCourssou |
| 8,157,635 B2 | 4/2012 | Hardy |
| 8,187,101 B2 | 5/2012 | Herrmann |
| 8,226,472 B2 | 7/2012 | Van Luchene |
| 8,231,453 B2 | 7/2012 | Wolf |
| 8,231,470 B2 | 7/2012 | Feeney |
| 8,239,487 B1 | 8/2012 | Hoffman |
| 8,246,439 B2 | 8/2012 | Kelly |
| 8,272,934 B2 | 9/2012 | Olive |
| 8,272,951 B2 | 9/2012 | Ganz |
| 8,272,956 B2 | 9/2012 | Kelly |
| 8,282,491 B2 | 10/2012 | Auterio |
| 8,287,367 B2 | 10/2012 | Hall |
| 8,287,383 B1 | 10/2012 | Etter |
| 8,287,384 B2 | 10/2012 | Auterio |
| 8,292,743 B1 | 10/2012 | Etter |
| 8,313,372 B2 | 11/2012 | Naicker |
| 8,317,584 B2 | 11/2012 | Aoki |
| 8,317,601 B1 | 11/2012 | Luciano, Jr. |
| 8,323,110 B2 | 12/2012 | Shibamiya |
| 8,328,642 B2 | 12/2012 | Mosites |
| 8,332,260 B1 | 12/2012 | Mysen |
| 8,332,544 B1 | 12/2012 | Ralls |
| 8,348,716 B2 | 1/2013 | Ganz |
| 8,348,762 B2 | 1/2013 | Willis |
| 8,348,767 B2 | 1/2013 | Mahajan |
| 8,348,768 B2 | 1/2013 | Auterio |
| 8,360,858 B2 | 1/2013 | LaRocca |
| 8,360,867 B2 | 1/2013 | VanLuchene |
| 8,360,868 B2 | 1/2013 | Shvili |
| 8,366,544 B2 | 2/2013 | Walker |
| 8,366,550 B2 | 2/2013 | Herrmann |
| 8,371,925 B2 | 2/2013 | Bonney |
| 8,376,826 B2 | 2/2013 | Katz |
| 8,382,572 B2 | 2/2013 | Hoffman |
| 8,388,427 B2 | 3/2013 | Yariv |
| 8,401,913 B2 | 3/2013 | Alivandi |
| 8,408,989 B2 | 4/2013 | Bennett |
| 8,439,759 B1 | 5/2013 | Mello |
| 8,475,262 B2 | 7/2013 | Wolf |
| 8,506,394 B2 | 8/2013 | Kelly |
| 8,512,150 B2 | 8/2013 | Herrmann |
| 8,583,266 B2 | 11/2013 | Herbrich |
| 8,636,591 B1 | 1/2014 | Hawk |
| 8,696,428 B1 | 4/2014 | Post |
| 8,715,068 B2 | 5/2014 | Arnone |
| 8,777,754 B1 | 7/2014 | Santini |
| 8,784,214 B2 | 7/2014 | Parks |
| 8,790,185 B1 | 7/2014 | Caldarone |
| 8,821,260 B1 | 9/2014 | DeSanti |
| 8,831,758 B1 | 9/2014 | Chu |
| 8,851,978 B1 | 10/2014 | Koh |
| 8,920,243 B1 | 12/2014 | Curtis |
| 8,961,319 B1 | 2/2015 | Pieron |
| 8,968,067 B1 | 3/2015 | Curtis |
| 9,138,639 B1 | 9/2015 | Ernst |
| 9,257,007 B2 | 2/2016 | Santini |
| 2002/0059397 A1 | 5/2002 | Feola |
| 2002/0072412 A1 | 6/2002 | Young |
| 2002/0094863 A1 | 7/2002 | Klayh |
| 2002/0095327 A1 | 7/2002 | Zumel |
| 2002/0115488 A1 | 8/2002 | Berry |
| 2002/0119824 A1 | 8/2002 | Allen |
| 2002/0151351 A1 | 10/2002 | Baerlocher |
| 2002/0165794 A1 | 11/2002 | Ishihara |
| 2002/0183105 A1 | 12/2002 | Cannon |
| 2002/0193162 A1 | 12/2002 | Walker |
| 2003/0008713 A1 | 1/2003 | Ushiro |
| 2003/0027619 A1 | 2/2003 | Nicastro |
| 2003/0032476 A1 | 2/2003 | Walker |
| 2003/0102625 A1 | 6/2003 | Katz |
| 2003/0109301 A1 | 6/2003 | Chudley |
| 2003/0157978 A1 | 8/2003 | Englman |
| 2003/0174178 A1 | 9/2003 | Hodges |
| 2003/0190960 A1 | 10/2003 | Jokipii |
| 2003/0216167 A1 | 11/2003 | Gauselmann |
| 2004/0002387 A1 | 1/2004 | Grady |
| 2004/0068451 A1 | 4/2004 | Lenk |
| 2004/0185932 A1 | 9/2004 | Lombardo |
| 2004/0215524 A1 | 10/2004 | Parkyn |
| 2004/0219969 A1 | 11/2004 | Casey |
| 2004/0224745 A1 | 11/2004 | Bregenzer |
| 2004/0225387 A1 | 11/2004 | Smith |
| 2004/0267611 A1 | 12/2004 | Hoerenz |
| 2005/0096117 A1 | 5/2005 | Katz |
| 2005/0114223 A1 | 5/2005 | Schneider |
| 2005/0165686 A1 | 7/2005 | Lack |
| 2005/0192087 A1 | 9/2005 | Friedman |
| 2005/0209008 A1 | 9/2005 | Shimizu |
| 2005/0227751 A1 | 10/2005 | Zanelli |
| 2005/0255914 A1 | 11/2005 | McHale |
| 2005/0277474 A1 | 12/2005 | Barry |
| 2006/0030407 A1 | 2/2006 | Thayer |
| 2006/0063587 A1 | 3/2006 | Manzo |
| 2006/0116196 A1 | 6/2006 | Vancura |
| 2006/0155597 A1 | 7/2006 | Gleason |
| 2006/0200370 A1 | 9/2006 | Ratliff |
| 2006/0217198 A1 | 9/2006 | Johnson |
| 2006/0287029 A1 | 12/2006 | Yoshinobu |
| 2006/0287102 A1 | 12/2006 | White |
| 2007/0021213 A1 | 1/2007 | Foe |
| 2007/0077988 A1 | 4/2007 | Friedman |
| 2007/0111770 A1 | 5/2007 | Van Luchene |
| 2007/0129139 A1 | 6/2007 | Nguyen |
| 2007/0129147 A1 | 6/2007 | Gagner |
| 2007/0191101 A1 | 8/2007 | Coliz |
| 2007/0191102 A1 | 8/2007 | Coliz |
| 2007/0213116 A1 | 9/2007 | Crawford |
| 2007/0281285 A1 | 12/2007 | Jayaweera |
| 2007/0287523 A1 | 12/2007 | Esses |
| 2008/0009344 A1 | 1/2008 | Graham |
| 2008/0032787 A1 | 2/2008 | Low |
| 2008/0058092 A1 | 3/2008 | Schwartz |
| 2008/0113706 A1 | 5/2008 | OHalloran |
| 2008/0113815 A1 | 5/2008 | Weingardt |
| 2008/0124353 A1 | 5/2008 | Brodeur |
| 2008/0154798 A1 | 6/2008 | Valz |
| 2008/0171599 A1 | 7/2008 | Salo |
| 2008/0176625 A1 | 7/2008 | Kelly |
| 2008/0194318 A1 | 8/2008 | Kralicky |
| 2008/0200260 A1 | 8/2008 | Deng |
| 2008/0207306 A1 | 8/2008 | Higbie |
| 2008/0214295 A1 | 9/2008 | Dabrowski |
| 2008/0227525 A1 | 9/2008 | Kelly |
| 2008/0234043 A1 | 9/2008 | McCaskey |
| 2008/0248867 A1 | 10/2008 | Englman |
| 2008/0275786 A1 | 11/2008 | Gluck |

(56) References Cited

U.S. PATENT DOCUMENTS

| | | |
|---|---|---|
| 2008/0300045 A1 | 12/2008 | Ratcliff |
| 2008/0318668 A1 | 12/2008 | Ching |
| 2009/0011812 A1 | 1/2009 | Katz |
| 2009/0017886 A1 | 1/2009 | McGucken |
| 2009/0036199 A1 | 2/2009 | Myus |
| 2009/0048918 A1 | 2/2009 | Dawson |
| 2009/0061982 A1 | 3/2009 | Brito |
| 2009/0124353 A1 | 5/2009 | Collette |
| 2009/0204907 A1 | 8/2009 | Finn |
| 2009/0210301 A1 | 8/2009 | Porter |
| 2009/0234710 A1 | 9/2009 | Belgaied Hassine |
| 2009/0315893 A1 | 12/2009 | Smith |
| 2010/0004048 A1 | 1/2010 | Brito |
| 2010/0022307 A1 | 1/2010 | Steuer |
| 2010/0035689 A1 | 2/2010 | Altshuler |
| 2010/0041472 A1 | 2/2010 | Gagner |
| 2010/0041481 A1 | 2/2010 | Smedley |
| 2010/0050088 A1 | 2/2010 | Neustaedter |
| 2010/0070056 A1 | 3/2010 | Coronel |
| 2010/0094841 A1 | 4/2010 | Bardwil |
| 2010/0099471 A1 | 4/2010 | Feeney |
| 2010/0107214 A1 | 4/2010 | Ganz |
| 2010/0113162 A1 | 5/2010 | Vemuri |
| 2010/0174593 A1 | 7/2010 | Cao |
| 2010/0198653 A1 | 8/2010 | Bromenshenkel |
| 2010/0210356 A1 | 8/2010 | Losica |
| 2010/0227675 A1 | 9/2010 | Luxton |
| 2010/0227682 A1 | 9/2010 | Reville |
| 2010/0228606 A1 | 9/2010 | Walker |
| 2010/0240444 A1 | 9/2010 | Friedman |
| 2010/0241491 A1 | 9/2010 | Eglen |
| 2010/0241492 A1 | 9/2010 | Eglen |
| 2010/0306015 A1 | 12/2010 | Kingston |
| 2011/0065511 A1 | 3/2011 | Mahan |
| 2011/0092271 A1 | 4/2011 | Nguyen |
| 2011/0092273 A1 | 4/2011 | Cerbini |
| 2011/0111841 A1 | 5/2011 | Tessmer |
| 2011/0112662 A1 | 5/2011 | Thompson |
| 2011/0113353 A1 | 5/2011 | Koh |
| 2011/0118002 A1 | 5/2011 | Aoki |
| 2011/0145040 A1 | 6/2011 | Zahn |
| 2011/0151957 A1 | 6/2011 | Falciglia |
| 2011/0218033 A1 | 9/2011 | Englman |
| 2011/0227919 A1 | 9/2011 | Bongio |
| 2011/0256921 A1 | 10/2011 | Pacey |
| 2011/0256936 A1 | 10/2011 | Walker |
| 2011/0263324 A1 | 10/2011 | Ganetakos |
| 2011/0275438 A9 | 11/2011 | Hardy |
| 2011/0281638 A1 | 11/2011 | Bansi |
| 2011/0281654 A1 | 11/2011 | Kelly |
| 2011/0282764 A1 | 11/2011 | Borst |
| 2011/0300923 A1 | 12/2011 | VanLuchene |
| 2011/0319152 A1 | 12/2011 | Ross |
| 2011/0319170 A1 | 12/2011 | Shimura |
| 2012/0011002 A1 | 1/2012 | Crowe |
| 2012/0015714 A1 | 1/2012 | Ocko |
| 2012/0015715 A1 | 1/2012 | Luxton |
| 2012/0034961 A1 | 2/2012 | Berman |
| 2012/0034973 A1 | 2/2012 | Frank |
| 2012/0040743 A1 | 2/2012 | Auterio |
| 2012/0040761 A1 | 2/2012 | Auterio |
| 2012/0042282 A1 | 2/2012 | Wong |
| 2012/0047002 A1 | 2/2012 | Patel |
| 2012/0059730 A1 | 3/2012 | Jensen |
| 2012/0083909 A1 | 4/2012 | Carpenter |
| 2012/0094743 A1 | 4/2012 | Odom |
| 2012/0101886 A1 | 4/2012 | Subramanian |
| 2012/0108306 A1 | 5/2012 | Munsell |
| 2012/0109785 A1 | 5/2012 | Karlsson |
| 2012/0115593 A1 | 5/2012 | Vann |
| 2012/0122589 A1 | 5/2012 | Kelly |
| 2012/0129590 A1 | 5/2012 | Morrisroe |
| 2012/0130856 A1 | 5/2012 | Petri |
| 2012/0142429 A1 | 6/2012 | Muller |
| 2012/0156668 A1 | 6/2012 | Zelin |
| 2012/0157187 A1 | 6/2012 | Moshal |
| 2012/0157193 A1 | 6/2012 | Arezina |
| 2012/0166380 A1 | 6/2012 | Sridharan |
| 2012/0166449 A1 | 6/2012 | Pitaliya |
| 2012/0178514 A1 | 7/2012 | Schulzke |
| 2012/0178515 A1 | 7/2012 | Adams |
| 2012/0178529 A1 | 7/2012 | Collard |
| 2012/0197874 A1 | 8/2012 | Zatkin |
| 2012/0202570 A1 | 8/2012 | Schwartz |
| 2012/0203669 A1 | 8/2012 | Borsch |
| 2012/0215667 A1 | 8/2012 | Ganz |
| 2012/0221430 A1 | 8/2012 | Naghmouchi |
| 2012/0226573 A1 | 9/2012 | Zakas |
| 2012/0231891 A1 | 9/2012 | Watkins |
| 2012/0244945 A1 | 9/2012 | Kolo |
| 2012/0244947 A1 | 9/2012 | Ehrlich |
| 2012/0244950 A1 | 9/2012 | Braun |
| 2012/0245988 A1 | 9/2012 | Pace |
| 2012/0256377 A1 | 10/2012 | Schneider |
| 2012/0282986 A1 | 11/2012 | Castro |
| 2012/0289315 A1 | 11/2012 | Van Luchene |
| 2012/0289330 A1 | 11/2012 | Leydon |
| 2012/0289346 A1 | 11/2012 | Van Luchene |
| 2012/0295699 A1 | 11/2012 | Reiche |
| 2012/0296716 A1 | 11/2012 | Barbeau |
| 2012/0302329 A1 | 11/2012 | Katz |
| 2012/0309504 A1 | 12/2012 | Isozaki |
| 2012/0311504 A1 | 12/2012 | vanOs |
| 2012/0322545 A1 | 12/2012 | Amone |
| 2012/0322561 A1 | 12/2012 | Kohlhoff |
| 2012/0330785 A1 | 12/2012 | Hamick |
| 2013/0005437 A1 | 1/2013 | Bethke |
| 2013/0005438 A1 * | 1/2013 | Ocko ................. G07F 17/3255 463/25 |
| 2013/0005466 A1 | 1/2013 | Mahajan |
| 2013/0005473 A1 | 1/2013 | Bethke |
| 2013/0005475 A1 | 1/2013 | Mahajan |
| 2013/0005480 A1 | 1/2013 | Bethke |
| 2013/0006735 A1 | 1/2013 | Koenigsberg |
| 2013/0006736 A1 | 1/2013 | Bethke |
| 2013/0012304 A1 | 1/2013 | Cartwright |
| 2013/0013094 A1 | 1/2013 | Parks |
| 2013/0013326 A1 | 1/2013 | Miller |
| 2013/0013404 A1 * | 1/2013 | Suprock ................. G06Q 30/02 705/14.53 |
| 2013/0013459 A1 | 1/2013 | Kerr |
| 2013/0029745 A1 | 1/2013 | Kelly |
| 2013/0072278 A1 | 3/2013 | Salazar |
| 2013/0079087 A1 | 3/2013 | Brosnan |
| 2013/0090173 A1 | 4/2013 | Kislyi |
| 2013/0090750 A1 | 4/2013 | Herrman |
| 2013/0095914 A1 | 4/2013 | Allen |
| 2013/0123005 A1 | 5/2013 | Allen |
| 2013/0124361 A1 | 5/2013 | Bryson |
| 2013/0151342 A1 | 6/2013 | Citron |
| 2013/0173393 A1 | 7/2013 | Calman |
| 2013/0178259 A1 | 7/2013 | Strause |
| 2013/0210511 A1 | 8/2013 | LaRocca |
| 2013/0217489 A1 | 8/2013 | Bendayan |
| 2013/0226733 A1 | 8/2013 | Evans |
| 2013/0237299 A1 | 9/2013 | Bancel |
| 2013/0244767 A1 | 9/2013 | Barclay |
| 2013/0288757 A1 | 10/2013 | Guthridge |
| 2013/0290147 A1 | 10/2013 | Chandra |
| 2013/0303276 A1 | 11/2013 | Weston |
| 2013/0310164 A1 | 11/2013 | Walker |
| 2013/0344932 A1 | 12/2013 | Adams |
| 2014/0004884 A1 | 1/2014 | Chang |
| 2014/0018156 A1 | 1/2014 | Rizzotti |
| 2014/0033262 A1 | 1/2014 | Anders |
| 2014/0038679 A1 | 2/2014 | Snow |
| 2014/0067526 A1 | 3/2014 | Raju |
| 2014/0067544 A1 | 3/2014 | Klish |
| 2014/0073436 A1 | 3/2014 | Takagi |
| 2014/0087864 A1 | 3/2014 | Togashi |
| 2014/0089048 A1 | 3/2014 | Bruich |
| 2014/0100020 A1 | 4/2014 | Carroll |
| 2014/0106858 A1 | 4/2014 | Constable |
| 2014/0128137 A1 | 5/2014 | Balise |

(56) References Cited

U.S. PATENT DOCUMENTS

| | | | |
|---|---|---|---|
| 2014/0157314 A1 | 6/2014 | Roberts |
| 2014/0206452 A1 | 7/2014 | Bambino |
| 2014/0243072 A1 | 8/2014 | Santini |
| 2014/0274359 A1 | 9/2014 | Helava |
| 2014/0295958 A1 | 10/2014 | Shono |
| 2014/0315616 A1 | 10/2014 | Avin |
| 2014/0329585 A1 | 11/2014 | Santini |
| 2014/0337259 A1 | 11/2014 | Lamb |
| 2015/0011286 A1 | 1/2015 | Kim |
| 2015/0019349 A1 | 1/2015 | Milley |
| 2015/0031440 A1 | 1/2015 | Desanti |
| 2015/0087378 A1 | 3/2015 | Louie |
| 2015/0306494 A1 | 10/2015 | Pieron |
| 2015/0335995 A1 | 11/2015 | McLellan |
| 2015/0352436 A1 | 12/2015 | Pieron |

FOREIGN PATENT DOCUMENTS

| | | |
|---|---|---|
| WO | 2013013281 | 1/2013 |
| WO | 2013059639 | 1/2013 |
| WO | 2013116904 | 1/2013 |
| WO | 2015013373 | 1/2015 |
| WO | 2015168187 | 11/2015 |
| WO | 2015179450 | 11/2015 |
| WO | 2015196105 | 12/2015 |

OTHER PUBLICATIONS

Wikipedia, Mafia Wars, <http://en.wikipedia.org/wiki/Mafia_Wars>, Jan. 28, 2012, 3 pages.

Gem System—Street Fighter X Tekken, http://www.street/fighter.com/us/sfxtk/features/gem-system, printed Nov. 6, 2012, 6 pages.

Profession—WoWWiki—Your guide to the World of Warcraft, URL: http://www.wowwiki.com/Profession, printed Nov. 6, 2012, 8 pages.

"Digital River World Payments and Lotaris Partner to Extend Mobile Application Licensing and Monetization Capabilities to Software Publishers", Business Wire Press Release, http://www.marketwatch.com/story/digital-river-world-payments-and-lotaris . . . , posted San Francisco, Mar. 27, 2012 (Business Wire), 8:30 a.m. EDT, printed May 24, 2012 2:32 PM, 3 pages.

"Behavioural Analytics & Campaigning", http://lotaris.com/behavioural._analytics_and._Campaigning.htm, screenshot access date May 24, 2012 2:21 PM, 1 page.

"I don't have enough resources/builders to upgrade anything in my village, what can I do?" gamesupport.supercell.net. Online. Accessed via the Internet. Accessed Aug. 9, 2014. <URL: https://gamesupport.supercell.net/hc/en-us/articles/421482-I-don-t-have-enough-resources-builders-to-upgrade-anything-in-my-village-what-can-l-do->, Apr. 23, 2014, 9 pages.

"Clash of Clans". Wikipedia.org. Online. Accessed via the Internet. Accessed Aug. 9, 2014. <URL: http://en.wikipedia.org/wiki/Clashof Clans>, 3 pages.

"Lotro-Wiki.com" (evidence in regards to "Lord of the Rings Oline" MMORPG game), latest Dec. 22, 2011, http://lotro-wiki.com/index.php/Main_Page) (hereinafter referred to as Lotro>, http://lotro-wiki.com/index.php?title=LOTRO_Store&oldid=396550, http://lotro-wiki.com/index.php?title=Quest:A_Little_Extra_Never_Hurts_—_Part_1&oldid=399597, http://lotro-wiki.com/index.php?title=Quest:A_Little_Extra_Never_Hurts_—_Part_2&oldid=399366, http://lotro-wiki.com/index.php?title=Getting_Started&oldid=349681, 33 pages.

"Gem calculation formulas", forum.supercell.net. Online. Accessed via the Internet. Accessed Aug. 9, 2014. <URL: http://forum.supercell.net/showthread.php/23028-Gem-calculation-formulas>, 3 pages.

"Building Structures". War2.warcraft.org. Online. Accessed via the Internet. Accessed Aug. 9, 2014. <URL: http://war2.warcraft.org/strategy/verybasics/building.shtml>, 3 pages.

City Coins. CityVille Wikia. Online. Accessed via the Internet. Accessed Aug. 9, 2014. <URL: http://cityville.wikia.com/wiki/City_Coins>, 2 pages.

Gaia "Black Friday Bundle" available on Nov. 23, 2011, from http://www.gaiaonline.com/forum/community-announcements/black-friday-big-bundles-rare-items/t.76127933/, 5 pages.

UBC, "Theory of Auctions" available on Mar. 24, 2012 from https://web.archive.org/web/20120324204610/http://montoya.econ.ubc.ca/Econ522/auctions.pdf, slide 5, Para. 1.3, 19 pages.

Wiki "Gala online", available on Sep. 9, 2011, https://web.archive.org/web/20110927210155/http://en.wikipedia.org/wiki/Gaia_Online, 8 pages.

FriskyMongoose "Happy Island Updates", available Jun. 12, 2012 from https://web.archive.org/web/20120612004417/http://friskymongoose.com/happy-island-updates-new-attractions-decorations-and-limited-edition-item-bundles/, 7 pages.

TFWiki "teamfortress wiki" available Nov. 5, 2011 retrieved from https://web.archive.org/web/20111105044256/http://wiki.teamfortress.com/wiki/Loadout, 4 pages.

MMO Site "Rose Online Launches the Newest in Game Feature"; available Aug. 11, 2011 from https://web.archive.org/web/20110811231226/http://news.mmosite.com/content/2011-06-21/rose_online_launches_the_newest_in_game_feature.1.shtml, 3 pages.

Super Mario Bros. 3 Review, Nintendo for NES, Feb. 1990, pp. 1-4.

Super Mario Bros. 3, NES Gameplay, http://www.youtube.com/watch?v=82TL-Acm4ts, 1 page.

"Kabam Community Forums > Kingdoms of Camelot > Kingdoms of Camelot Open Discussion > Open Discussion : Tournament of Might Prizes / Main Discussion thread", printed from http://community.kabam.com/forums/archive/index.php/t-43273.html, Oct. 24, 2011, 23 pages.

"Rest—WoWWiki—Your guide to the World of Warcraft", printed from http://www.wowwiki.com/Rest, May 19, 2014, 2 pages.

'Quest item—WoWWiki—Your guide to the World of Warcraft', printed from http://www.wowwiki.com/Quest_Item, Retrieved on Apr. 16, 2014, 1 page.

"Cataclysm Guide: Guild Advancement—Wowhead", http://www.wowhead.com/guide=cataclysm&guilds, printed Dec. 5, 2013, 4 pages.

TFF Challenge—UC Davis, http://tffchallenge.com/team/uc-davis/, printed Jan. 15, 2014, 12 pages.

"Guild Housing System—FlyFF Wiki", http://flyff-wiki.gpotato.com/wiki/Guild_Housing_System, printed Dec. 5, 2013, 5 pages.

Elsword, Dec. 27, 2007, KOG Studios, Guide posted Mar. 17, 2011, http://forums.elswordonline.com/topic5673.aspx, http://en.wikipedia.org/wiki/Elsword, 16 pages.

Diablo 2, Blizzard Entertainment, Mar. 23, 2009, manual and online website, http://web.archive.Org/web/20090323171356/http://classic.battle.net/diablo 2exp/items/basics.shtml, 51 pages.

Path of Exile, Internet posting: http://web.archive.org/web/20120606004658/http://www.pathofexile.com/forum/view-thread/12056, Nov. 16, 2011, 52 pages.

MapleStory—Guides—Equipment Upgrading 101: Scrolls, URL: maplestory.nexon.net/guides/game-play/systems/OOFFV/#mitigating [Retrieved Jun. 24, 2013], 4 pages.

MapleStory—Guides—Equipment Upgrading 101: Potentials, URL: maplestory.nexon.net/guides/game-play/systems/OOFIj/ [Retrieved Jun. 24, 2013], 5 pages.

Dreamslayer's Enchanting and Upgrading Guide—With Pictures:D and Explanations, URL: forums.elswordonline.com/Topic5673.aspx [Retrieved Feb. 21, 2013], 8 pages.

The Arreat Summit—Items: Basic Item Information, URL: web.archive.org/web/20090323171356/http://classic.battle.net/diablo2exp/items/basics.shtml [Retrieved Feb. 21, 2013], 3 pages.

Elsword—Wikipedia, the free encyclopedia, URL: en.wikipedia.org/wiki/Elsword [Retrieved Feb. 21, 2013], 6 pages.

Path of Exile—Forum—Beta General Discussion—Unique Items Compendium 60/71 URL: web.archive.org/web/20120608004658/http://www.pathofexile.com/forum/view-thread/12056 [Retrieved Jun. 24, 2013], 52 pages.

Super Mario Bros. 3, StrategyWiki, the video game walkthrough and strategy guide, http://strategywiki.org/wiki/Super_Mario_Bros._3, 4 pages.

(56) References Cited

OTHER PUBLICATIONS

MapleStory, Internet guide: http://maplestory.nexon.net/guides/game-play/systems/00Flk/, http://maplestory.nexon.net/guides/game-play/systems/00Flk, http://maplestory.nexon.net/guides/game-play/systems/00FFV, Sep. 28, 2012, 12 pages.

"Warcraft II: Tides of Darkness". Wikipedia.org. Online. Accessed via the Internet. Accessed Aug. 9, 2014. <URL: http://en.wikipedia.org/wiki/Warcraft_II:_Tides_of_Darkness>, 10 pages.

"How Town Hall to Level 4". Forum.supercell.net. Online. Jan. 31, 2013. Accessed via the Internet. Accessed Feb. 21, 2015. URL:http://forum.supercell.net/showthread.php/15052-How-Town-Hall-to-Level-4, 2 pages.

Hamari, Juho, "Game Design as Marketing: How Game Mechanics Create Demand for Virtual Goods", available on vol. 5, Issue 1, 2010, retrieved from Int. Journal of Business Science and Applied Management—http://www/business-and-management.org/library/2010/5_1—14-29-Hamari,Lehdonvirta.pdf, on May 26, 2015, 16 pages.

"Digital River World Payments and Lotaris Partner to Extend Mobile Application Licensing and Monetization Capabilities to Software Publishers", Lotaris Press Release, http://www.lotaris.com/digital_river_world_payments_and_lotaris_partne . . . , posted Tuesday, Mar. 27, 2012, screenshop access date May 24, 2012, 2:19 PM, 1 page.

MapleStory—Guides—Equipment Upgrading 101: Enhancements, URL: maplestory.nexon.net/guidesgame-play/systems/OOFlk; [Retrieved Jun. 24, 2013] 3 pages.

Katkoff, Michail, "Clash of Clans—the Winning Formula", Sep. 16, 2012, retrieved from Internet on Sep. 30, 2015 from URL <http://www.deconstructoroffun.com/2012/09/clash-of-clans-winning-formula.html>, 13 pages.

Ozeagle, "What happens if . . . answers about account types" on Lotro forum, Jan. 18, 2011,<https://www.lotro.com/forums/showthread.php?377885-What-happens-if-answers-about-the-account-types> (16 pgs).

<http://lotro-wiki.com/index.php?title=Ouest:A_Littlle_Extra_Never_Hurts_—_Part_2&oldid=399366>, <http://lotrowiki.com/index.php?title=Getting_Started&oldid=349681 >. Links are to used articles. (7 pgs) Feb. 26, 2014.

"Lotro-Wiki.com" (evidence in regards to "Lord of the Rings Oline" MMORPG game),latest Dec. 22, 2011,<http://lotrowiki.com/index.php/Main_Page)(hereinafter referred to as Lotro>.

"Treasure Chest Game" written by Zelda Wiki, the Zelda encyclopedia; published on or before Oct. 17, 2012; accessible andprinted from URL <http://web.archive.org/web/20121017085058/http://zeldawiki.org/Treasure_Chest_Game>, 4 pages.

"Quest: A Little Extra Never Hurts—Part 1" written by Zimoon, published on Dec. 22, 2011 and printed from URL <http://lotro-wiki.com/index.php?title=Quest:A_Little_Extra_Never_Hurts_—_Part_1 &oldid=399597>, 3 pages.

"Quest: A Little Extra Never Hurts—Part 2" written by Zimoon, published on Dec. 21, 2011 and printed from URL <http://lotro-wiki.com/index.php?title=Quest:A_Little_Extra_Never_Hurts_—_Part_2&oldid=399366>, 2 pages.

"Getting Started" written by BoD, published on Oct. 13, 2011 and printed from URL <http://lotrowiki.com/index.php?title=Getting_Started&oldid=349681 >, 5 pages.

"Lotro Store" written by Elinnea, published on Dec. 15, 2011 and printed from URL <http://lotrowiki.com/index.php ?title=LOTRO_Store&oldid=396550>, 23 pages.

"Main Page" written by Starbusty, published on Dec. 12, 2011 and printed from URL <http://lotrowiki.com/index.php?title=Main_Page&oldid=394429>, 2 pages.

* cited by examiner

METHOD AND SYSTEM FOR FACILITATING CHANCE-BASED PAYMENT FOR ITEMS IN A GAME

FIELD OF THE DISCLOSURE

This disclosure relates to a method and system for facilitating chance-based payment for items in a game. In implementations, the disclosure relates to such systems which can be used in the payment for items in an affiliation-based game.

BACKGROUND

In many conventional strategy based games it is common for users to group together to form alliances or other affiliations. The affiliations allow users to have interactions with other users and also may enable the users to share items and actions in the games. Affiliations often have a hierarchical structure in which different users have different statuses. There is typically a leader of the affiliation: often the user who formed the affiliation.

In conventional situations, when items are needed by the affiliation to pursue, for example, a certain action, battle, etc., the items are usually purchased by the leader of the affiliation. This places a burden on the leader and prevents other users in the affiliation from getting involved in the acquisition of items. In fact, for some users there is no responsibility involved with being in an affiliation. This can be tedious for the leader and can discourage the leader and, as a result, other users in the affiliation from playing the game and place limitations on revenue generation. Accordingly, alternative approaches regarding paying for group items for use in a game may provide an improved experience for the users, particularly for users in affiliations, and generate increased revenue.

SUMMARY

One aspect of the disclosure relates to a system for facilitating chance-based payment for items in a game. In exemplary implementations, a user may be part of an affiliation and wish to contribute to their affiliation and show their loyalty in a non-direct manner. The contribution may be achieved by the user entering into a chance-based selection process such as a draw, where the user selected in the draw pays for an item used by the affiliation in the game. The item may be used by some or all of the affiliation members.

The system may comprise one or more microprocessors configured to execute computer program components. The computer program components may include a game component, a group offer component, a payment pledge component, a selection and collection component, an award component, and/or other components.

The game component may be configured to execute an instance of an online game, and to facilitate participation in the online game by users via client computing platforms.

The group offer component may be configured to effectuate presentation of offers to sell group virtual items to a group of users, wherein a group virtual item is a virtual item that provides a benefit to the users of the group in the online game, wherein the offers to sell group virtual items include prices of the group virtual items, the offers including a first offer to sell a first group virtual item to the group of users for a first price, the group of users including a first user, a second user, and a third user.

The payment pledge component may be configured to obtain pledges from individual users in the group for payment of the prices for group virtual items offered for sale.

The selection and collection component may be configured to make chance-based selections of which users that have pledged payment of the prices for group virtual items will make the pledged payments, and to collect such payments in exchange for distribution of the group virtual items to the group of users such that where the first user and the second user have pledged payment of the first price, and the selection and collection component has made a chance-based selection of the first user, payment of the first price is collected from the first user and the first group virtual item is distributed to the group of users such that the first user, the second user, and the third user receive the benefit of the first group virtual item in the online game.

In some implementations, the first user, the second user, and the third user receive the benefits of the first group virtual item simultaneously.

In some implementations, the first user, the second user, and the third user receive the benefits of the first group virtual item in alternating fashion.

In some implementations, the group of users may be an affiliation. An affiliation is a group relationship in the game that has a functional impact on gameplay. For example, users within an affiliation may have enhanced communication, may be able to contribute resources to each other, may compete with other affiliations on one or more gameplay metrics, etc. Affiliations may include, by way of example, alliances, guilds, clans, etc.

In some implementations, all members of the affiliation may share group virtual items purchased by members of the affiliation.

In some implementations, the payment is collected in the form of a virtual currency used only for this purpose. The virtual currency may be obtained through participation in the online game. In some implementations, the item may be less expensive when paid for with the virtual currency than when purchased directly with another currency.

In some implementations, the selection and collection component is configured to make the chance-based selections once a predetermined number of pledges have been obtained.

The award component may be configured to deliver awards to selected users. The award may include a virtual item usable by the user who obtains it in the online game.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
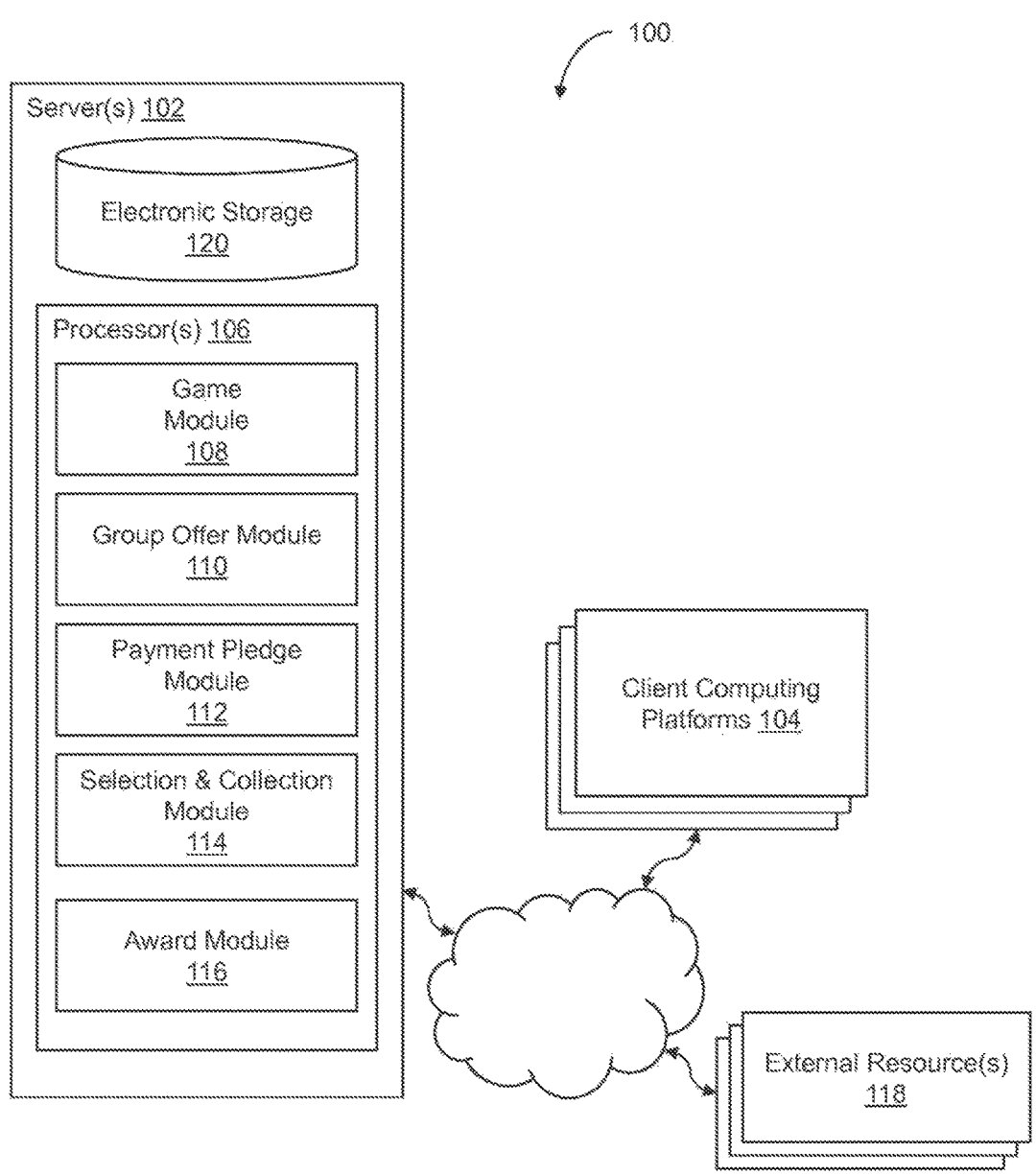
FIG. 1 illustrates a system for facilitating chance-based payment for items in a game, in accordance with one or more implementations.

FIG. 1 illustrates a system 100 configured to provide a virtual space to users. System 100 is only one example of a suitable computing environment and is not intended to suggest any limitation as to the scope of use or functionality of the features described herein.

In this disclosure, a user may be able to participate in an online game with other users, each user accessing the game via a client computing platform. The user may be part of an affiliation and wish to contribute to the affiliation and show their loyalty to the affiliation. This may be achieved by users pledging to pay for a group item for use by the affiliation. A number of users may make a pledge and one or more are selected to pay for the item in a chance-based selection process. The selection may be triggered based on the number of users that have made a pledge. The item used in the game may be used by some or all of the affiliation members. Providing the virtual space may include hosting the virtual space over a network.

In some implementations, system 100 may include a server or servers 102. The server 102 may be configured to communicate with one or more client computing platforms 104 according to a client/server architecture. The users may access system 100 and/or the virtual space via client computing platforms 104, for instance, to engage in one or more games.

The server 102 may be configured to execute one or more computer program components using one or more processors 106. The computer program components may include one or more of a game component 108, a group offer component 110, a payment pledge component 112, a selection and collection component 114, an award component 116 and/or other components.

The game component 108 may be configured to execute an instance of an online game and to facilitate participation in the online game by users via client computing platforms.

The game may be provided within a virtual space, and may include a plurality of resource types and/or maps. An instance of the virtual space may be executed by computer components to determine views of the virtual space. The views may then be communicated (e.g., via streaming, via object/position data, and/or other information) from server(s) 102 and/or other sources to client computing platforms 104 for presentation to users. The view determined and transmitted to a given client computing platform 104 may correspond to a user-controlled element. The view determined and transmitted to a given client computing platform 104 may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via clients (e.g., client computing platform(s) 104) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial section of the space. In some instances, the topography may describe a volume with one or more bodies positioned therein (e.g., a simulation of gravity-deprived space with one or more celestial bodies positioned therein). The instance executed by the computer components may be synchronous, asynchronous, and/or semi-synchronous.

The above description of the manner in which views of the virtual space are provided is not intended to be limiting. The virtual space may be expressed in a more limited, or rich, manner. For example, views determined for the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that corresponds to an individual user. The user character may be controlled by the user with which it is associated. The user-controlled element(s) may move through and interact with the virtual space (e.g., non-user characters in the virtual space, other objects in the virtual space). The user-controlled elements controlled by and/or associated with a given user may be created and/or customized by the given user. The user may have an "inventory" of virtual goods and/or currency (e.g., resources of the plurality of resource types) that the user can use (e.g., by manipulation of a user character or other user-controlled element, and/or other items) to perform in-game actions within the virtual space.

The users may participate in the instance of the virtual space by controlling one or more of the available user-controlled elements in the virtual space. Control may be exercised through control inputs and/or commands input by the users through client computing platforms 104. The users may interact with each other through communications exchanged within the virtual space. Such communications may include one or more of textual chat, instant messages, private messages, voice communications, and/or other communications. Communications may be received and entered by the users via their respective client computing platforms 104. Communications may be routed to and from the appropriate users through server(s) 102.

The instance of the online game may be persistent. That is, the online game may continue on whether or not individual users are currently logged in and/or participating in the online game. A user that logs out of the online game and then logs back in some time later may find the virtual space associated with the online game has been changed through the interactions of other users with the virtual space during the time the user was logged out. These changes may include changes to the simulated physical space, changes in the user's inventory, changes in other users' inventories, changes experienced by non-user characters, and/or other changes.

The group offer component 110 may be configured to effectuate presentation of offers to sell group virtual items to a group of users, which may include prices of the group virtual items. A group virtual item is any virtual item that may provide benefits to more than one user in a group of users in an online game. Such items may include additional troops for battle, additional powers and capabilities, specific items that are relevant to the action about to be taken, weapons, defense powers, health credits and/or any other item. The group of users may include any number of users, in the present example three users are considered. The offers may include a first offer to sell a first group virtual item to the group of users for a first price. The group of users may be an affiliation. An affiliation is a group relationship in a game that has a functional impact on the gameplay in an online game. For example, users with in an affiliation may have enhanced communication, may be able to contribute resources to each other, may be able to compete with other affiliations on one or more gameplay metrics, etc. The group of users may also be an affiliation of users that have agreed to participate in a cooperative manner in one or more instances of an online game the offers including a first offer to sell a first group virtual item to the group of users for a first price, the group of users including a first user, a second user, and a third user.

The payment pledge component 112 may be configured to obtain pledges from individual users in the group of users for payment of the prices for the group virtual items offered for sale. In implementations, the pledge may be an agreement to pay the entire price of a group item if the user is selected. In other implementations, the pledge may be an agreement to pay part of the price of a group virtual item if the user is one of multiple users selected to make payment. The users that make pledges to pay for the virtual items may be identified by the system and their details stored in a memory location.

The selection and collection component 114 may be configured to make a chance-based selection, from the users that have made a pledge to pay for a group virtual item, of the user that will make the pledged payment. Selection may be triggered by a predetermined number of pledges being obtained by the payment pledge component 112 and/or other criteria. In implementations, the selection and collection component 114 may select a single user from the group of users to make the pledged payment or may select a plurality of users from the group to share the pledged payment. The selection mechanism may be in the form of a draw, in which one user is selected at random. The random selection may be made using a random number generator and/or any other type of device. Other selection mechanisms may alternatively be used. In implementations, different users may have a greater or lesser likelihood of being selected in the draw, and/or may be responsible for a greater or lesser share of the total payment if selected as one of a plurality of selected users, based on any number of factors such as position within an affiliation, playing frequency, available funds, etc.

After a user has been selected, the selection and collection component 114 may be configured to collect the pledged payment from the selected user in exchange for distribution of the group virtual item to the group of users. For example if a first and second user have pledged payment of the price for the virtual group item and the selection process has selected the first user, payment of the price is collected from the first user and the group virtual item is distributed to the group for the benefit of all three users. In some implementations, the first, second and third user receive the benefits of the group virtual item simultaneously, for example the virtual item may confer a stat increase to all three users. In some implementations, the first, second and third users receive the benefits of the group virtual item in an alternating fashion. For example, only the first user might receive a stat increase for a certain period of time, and then the first user would lose the stat increase and only the second user would receive it, etc. In the case where the first, second and third users are members of an affiliation, the affiliation may share the group virtual item with some or all of the members of the affiliation.

Payment may be collected in the form of a virtual currency that is used only for the purpose of pledging for group virtual items. The virtual currency in question may be obtained through participation in the online game and/or by any other process. In some implementations, the group virtual item is less expensive when paid with using the virtual currency than it would be when purchased using any other type of currency. For example, the group virtual item might cost 5,000 gold if purchased directly by the user through a shop interface or similar, with no chance involved in the purchase process, but might cost only 4,000 pledge dollars if paid for using the chance-based payment option, where the pledge dollars are convertible 1:1 into gold. This may encourage use of the chance-based payment option.

The award component 116 may be configured to deliver awards to selected users. These awards may be given to users who were selected to make payment for a groupt virtual item and may include a virtual item usable by that user in the online game. The award component may be configured to give many different types of awards based on many different criteria. In some implementations, users who pledged may receive some award even if not selected to make payment.

In some implementations, the server 102, client computing platforms 104, and/or external resources 118 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 102, client computing platforms 104, and/or external resources 118 may be operatively linked via some other communication media.

A given client computing platform 104 may include one or more processors configured to execute computer program components. The computer program components may be configured to enable an expert or user associated with the given client computing platform 104 to interface with system 100 and/or external resources 118, and/or provide other functionality attributed herein to client computing platforms 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 118 may include sources of information, hosts and/or providers of virtual environments outside of system 100, external entities participating with system 100, and/or other resources. In some implementations, some or all of the functionality attributed herein to external resources 118 may be provided by resources included in system 100.

Server 102 may include electronic storage 120, one or more processors 106, and/or other components. Server 102 may include communication lines, or ports to enable the exchange of information with a network and/or other computing platforms. Illustration of server 102 in FIG. 1 is not intended to be limiting. Server 102 may include a plurality of hardware, software, and/or firmware components operating together to provide the functionality attributed herein to server 102. For example, server 102 may be implemented by a cloud of computing platforms operating together as server 102.

Electronic storage 120 may comprise non-transitory storage media that electronically stores information. The electronic storage media of electronic storage 120 may include one or both of system storage that is provided integrally (i.e., substantially non-removable) with server 102 and/or removable storage that is removably connectable to server 102 via, for example, a port (e.g., a USB port, a firewire port, etc.) or a drive (e.g., a disk drive, etc.). Electronic storage 120 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 126 may include one or more virtual storage resources (e.g., cloud storage, a virtual private network, and/or other virtual storage resources). Electronic storage 120 may store software algorithms, information determined by processor 106, information received from server 102, information received from client computing platforms 104, and/or other information that enables server 102 to function as described herein.

Processor(s) 106 is configured to provide information processing capabilities in server 102. As such, processor 106 may include one or more of a digital processor, an analog processor, a digital circuit designed to process information, an analog circuit designed to process information, a state machine, and/or other mechanisms for electronically processing information. Although processor 106 is shown in FIG. 1 as a single entity, this is for illustrative purposes only. In some implementations, processor 106 may include a plurality of processing units. These processing units may be physically located within the same device, or processor 106 may represent processing functionality of a plurality of devices operating in coordination. The processor 106 may be configured to execute components 108, 110, 112, 114, and 116. Processor 106 may be configured to execute components 108, 110, 112, 114, and 116 by software; hardware; firmware; some combination of software, hardware, and/or firmware; and/or other mechanisms for configuring processing capabilities on processor 106. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although 108, 110, 112, 114, and 116 are illustrated in FIG. 1 as being implemented within a single processing unit, in implementations in which processor 106 includes multiple processing units, one or more of components 108, 110, 112, 114, and 116 may be implemented remotely from the other components. The description of the functionality provided by the different components 108, 110, 112, 114, and 116 described below is for illustrative purposes, and is not intended to be limiting, as any of components 108, 110, 112, 114, and 116 may provide more or less functionality than is described. For example, one or more of components 108, 110, 112, 114, and 116 may be eliminated, and some or all of its functionality may be provided by other ones of components 108, 110, 112, 114, and 116. As another example, processor 106 may be configured to execute one or more additional components that may perform some or all of the functionality attributed below to one of components 108, 110, 112, 114, and 116.

Figure 2:
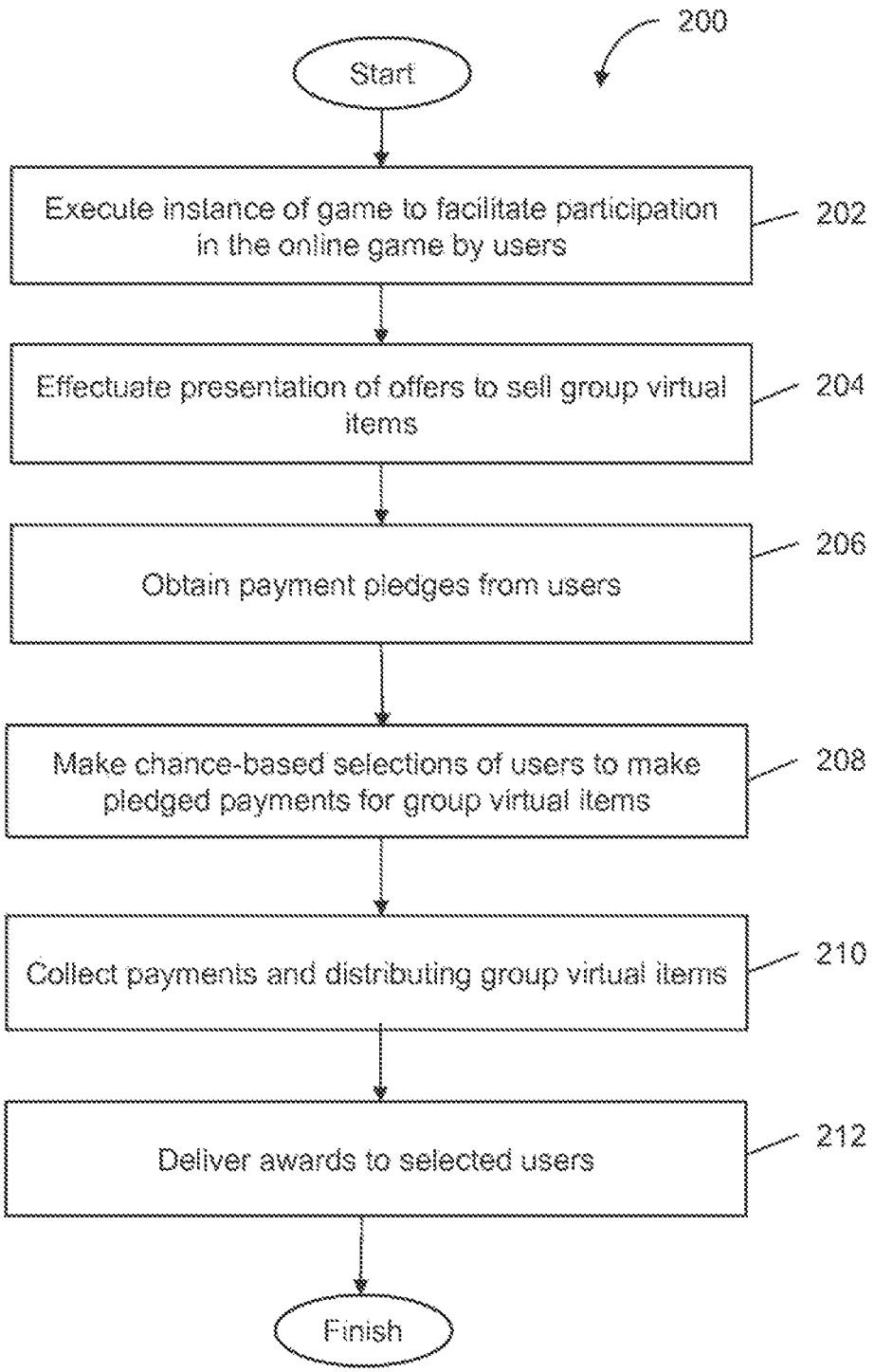
FIG. 2 illustrates a method for operating a chance-based payment for items in a game, in accordance with one or more implementations.

FIG. 2 illustrates a method 200 for facilitating chance-based payment for items in a game. The operations of method 200 presented below are intended to be illustrative. In some embodiments, method 200 may be accomplished with one or more additional operations not described, and/or without one or more of the operations discussed. Additionally, the order in which the operations of method 200 are illustrated in FIG. 2 and described below is not intended to be limiting.

In some embodiments, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, an instance of an online game may be executed to facilitate participation in the online game by users via client computing platforms. Operation 202 may be performed by a game component that is the same as or similar to game component 108, in accordance with one or more implementations.

At an operation 204, offers to sell group virtual items may be presented to a group of users. The group virtual items may be virtual items that provide benefits to the users of the group in the online game. The offers to sell group virtual items may include prices of the group virtual items. In implementations, the offers may include a first offer to sell a first group virtual item to the group of users for a first price, the group of users including a first user, a second user, and a third user. Operation 204 may be performed by a group offer component that is the same as or similar to at least group offer component 110, in accordance with one or more implementations.

At an operation 206, payment pledges may be obtained from users for payment of the price for one or more group virtual items offered for sale. These pledges commit the users to pay for the group virtual item they pledged for if they are selected from among all pledging users in the group for that item. Pledging users understand there is some probability of being responsible for making payment for the group virtual item. Operation 206 may be performed by a payment pledge component that is the same as or similar to at least payment pledge component 212.

At an operation 208, users are selected to make pledged payments for the group virtual items offered for sale. The selection may be chance-based, e.g. random among users who pledged. A first and second user may have pledged to pay for a first group virtual item in question. A selection is made, for example by way of a random selection from the group of users that have pledged to pay for the group virtual item. For example, the first user may be selected to pay the full price for the first group virtual item. Operation 208 may be performed by a selection and collection component that is the same as or similar to selection and collection component 114.

At an operation 210, payments are collected for the pledged group virtual items from the selected users and the pledged group virtual items are distributed to the group. In implementations, payment is collected from the first user for the first group virtual item and the first group virtual item is distributed to the group. Payment may be collected in the form of a virtual currency used only for this purpose. The item may be less expensive when paid for with the virtual currency than when purchased directly with any other currency. This operation may be performed by a selection and collection component that is the same as or similar to selection and collection component 114.

At an operation 212, an award may be delivered to the selected users from whom payment was collected. The awards may include a virtual item usable by the user who obtains it in the online game. In implementations, awards may also be delivered to one or more pledged users who were not selected, and delivery of the award may be based on factors such as chance and user characteristics. This operation may be performed by an award component that is the same as or similar to award component 116.

Figure 3:
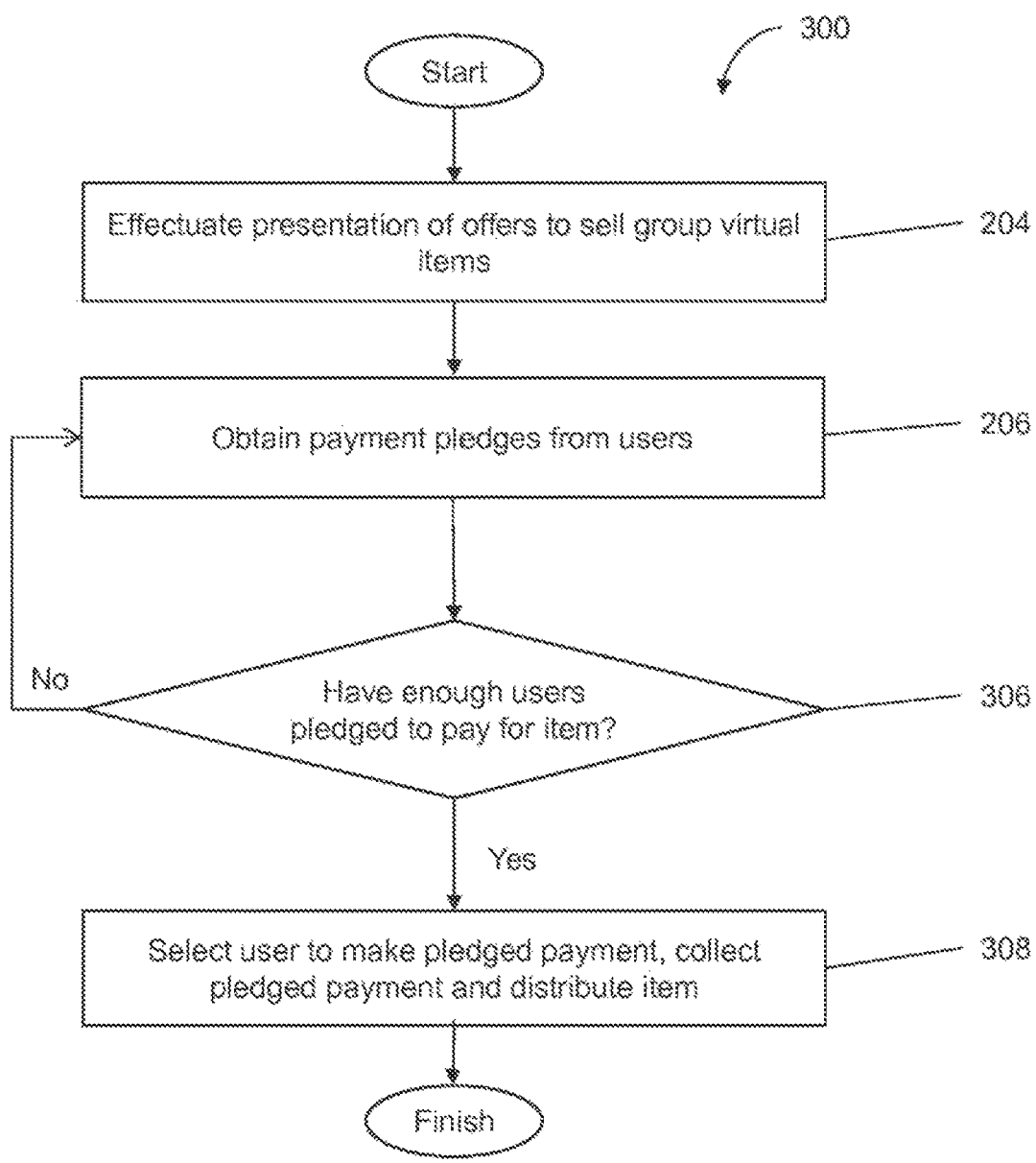
FIG. 3 illustrates a method for determining if enough users have pledged a payment, in accordance with one or more implementations.

FIG. 3 illustrates a method 300 for determining if sufficient users have pledged a payment for the price of a group virtual item that has been offered for sale. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 3 and described below is not intended to be limiting.

In some embodiments, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300. Operations 204 and 206 are described above with reference to FIG. 2.

At an operation 306, a determination is made as to whether sufficient users have pledged to pay for a group virtual item. If a predetermined number of pledges has not been reached, the process continues to obtain payment pledges and determine whether enough users have pledged until the predetermined number is reached. Once the predetermined number of users has been reached method 300 continues to operation 308. Operation 306 may be performed by a payment pledge component that is the same as or similar to the payment pledge component 112 and/or by a selection and collection component that is the same as or similar to selection and collection component 114, in accordance with one or more implementations.

At an operation 308, a user is selected to make the pledged payment for the group virtual item offered for sale, payment is collected from the selected user and the group virtual item is distributed to the group. A first and second user may have pledged to pay for the group virtual item in question. A selection is made, for example by way of a random selection from the group of users that have pledged to pay for the group virtual item. For example the first user may be selected to pay the price for the group virtual item. At operation 308 payment may then be collected from the first user in exchange for distribution of the group virtual item to the group of users. The payment is collected from the first user and the group virtual item is distributed to all users in the group/affiliation. Payment may be collected in the form of a virtual currency used only for this purpose. The item may be less expensive when paid for with the virtual currency than when purchased directly with another currency. Operation 308 may be performed by a component that is the same as or similar to selection and collection component 114.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for facilitating chance-based payment for items in a game, the system comprising:
one or more physical computer processors configured by machine-readable instructions to:
execute an instance of an online game, and to use the instance to generate game state information that is transmitted to client computing platforms over a network, the game state information facilitating presentation of views of the online game to users via the client computing platforms wherein execution of the instance of the online game includes performing operations in the instance in response to commands received over the network from the client computing platforms to enable interaction by the users with the online game and/or each;
effectuate presentation of offers to sell one or more virtual items to a group of users, wherein the one or more virtual items provide a benefit to one or more the users in the group of users in the online game, wherein the offers to sell the one or more virtual items include prices of the one or more virtual items, the offers including a first offer to sell one or more first virtual items, to the group of users for a first price, the group of users including a first user, a second user, and a third user;
obtain pledges from individual users in the group of users for payment of the prices for the one or more virtual items offered for sale; and
make chance-based selections of which users that have pledged payment of the prices for the one or more virtual items will make the pledged payments, and to collect such payments in exchange for distribution of the one or more virtual items to the group of users such that where the first user and the second user have pledged payment of the first price, and a chance-based selection of the first user has been made, payment of the first price is collected from the first user and the one or more first virtual items are distributed to one or more users in the group of users such that the first user, the second user, and/or the third user receive the benefit of the one or more first virtual items, in the online game.

2. The system of claim 1, wherein the first user, the second user, and the third user receive the benefits of one or more of the first virtual items simultaneously.

3. The system of claim 1, wherein the first user, the second user, and the third user receive the benefits of one or more of the first virtual items in alternating fashion.

4. The system of claim 1, wherein the group of users is an affiliation.

5. The system of claim 4, wherein all members of the affiliation share virtual items purchased by members of the affiliation.

6. The system of claim 1, wherein the payment is collected in the form of a virtual currency used only for this purpose.

7. The system of claim 6, wherein the virtual currency may be obtained through participation in the online game.

8. The system of claim 6, wherein the item is less expensive when paid for with the virtual currency than when purchased directly with another currency.

9. The system of claim 1, wherein the one or more physical computer processors are configured by machine-readable instructions to make the chance-based selections once a predetermined number of pledges have been obtained.

10. The system of claim 1, wherein the one or more physical computer processors are further configured by machine-readable instructions to deliver awards to the selected users.

11. A computer-implemented method for facilitating chance-based payment for items in a game, the method being implemented in a computer system that includes one or more processors executing computer program components, the method comprising:
executing an instance of an online game and using the instance to generate game state information that is transmitted to client computing platforms over a network, the game state information facilitating presentation of views of the online game to users via the client computing platforms wherein execution of the instance of the online game includes performing operations in the instance in response to commands received over the network from the client computing platforms to enable interaction by the users with the online game and/or each other;
effectuating presentation of offers to sell one or more virtual items to a group of users, wherein the one or more virtual items provide a benefit to one or more the users in the group of users in the online game, wherein the offers to sell the one or more virtual items include prices of the one or more virtual items, the offers including a first offer to sell one or more first virtual items to the group of users for a first price, the group of users including a first user, a second user, and a third user;
obtaining pledges from individual users in the group of users for payment of the prices for the one or more virtual items offered for sale; and
making chance-based selections of which users that have pledged payment of the prices for the virtual items will make the pledged payments, and collecting such payments in exchange for distribution of the virtual items to the one or more users such that where the first user and the second user have pledged payment of the first price, and a chance-based selection has been made of the first user, payment of the first price is collected from the first user and the one or more first virtual items are distributed to the one or more users in the group users such that the first user, the second user, and/or the third user receive the benefit of the one or more first virtual items in the online game.

12. The method of claim 11, wherein the first user, the second user, and the third user receive the benefits of one or more of the first virtual items simultaneously.

13. The method of claim 11, wherein the first user, the second user, and the third user receive the benefits of one or more of the first virtual items in alternating fashion.

14. The method of claim 11, wherein the group of users is an affiliation.

15. The method of claim 14, wherein all members of the affiliation share the virtual items purchased by members of the affiliation.

16. The method of claim 11, wherein the payment is collected in the form of a virtual currency used only for this purpose.

17. The method of claim 16, wherein the currency may be obtained through participation in the online game.

18. The method of claim 16, wherein the item is less expensive when paid for with the currency than when purchased directly with another currency.

19. The method of claim 11, wherein the chance-based selections are made once a predetermined number of pledges have been obtained.

20. The method of claim 11, further comprising delivering awards to the selected users.

* * * * *